United States Patent
Zhao et al.

(10) Patent No.: US 12,025,730 B2
(45) Date of Patent: Jul. 2, 2024

(54) METHOD FOR ESTIMATING NONDIRECTIONAL WAVE SPECTRUM FROM SEA ECHOES OF MULTIPLE HIGH RADAR FREQUENCIES

(71) Applicant: Wuhan University, Wuhan (CN)

(72) Inventors: Chen Zhao, Wuhan (CN); Min Deng, Wuhan (CN); Zezong Chen, Wuhan (CN); Fan Ding, Wuhan (CN); Jian Li, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 292 days.

(21) Appl. No.: 17/711,076

(22) Filed: Apr. 1, 2022

(65) Prior Publication Data

US 2022/0326348 A1    Oct. 13, 2022

(30) Foreign Application Priority Data

Apr. 1, 2021   (CN) .......................... 202110352889.X

(51) Int. Cl.
*G01S 7/35*    (2006.01)
*G01S 13/88*   (2006.01)
*G01S 7/41*    (2006.01)

(52) U.S. Cl.
CPC .............. *G01S 7/354* (2013.01); *G01S 7/356* (2021.05); *G01S 13/88* (2013.01); *G01S 7/41* (2013.01); *Y02A 90/40* (2018.01)

(58) Field of Classification Search
CPC .......... G01S 7/354; G01S 7/356; G01S 13/88; G01S 7/41; Y02A 90/10
See application file for complete search history.

(56) References Cited

U.S. PATENT DOCUMENTS

2003/0210179 A1* 11/2003 Dizaji ..................... G01S 7/292
                                                                  342/194
2004/0178951 A1*  9/2004 Ponsford ................. G01S 7/32
                                                                  342/194

OTHER PUBLICATIONS

Chen Z, Li J, Zhao C, Ding F, Chen X. The Scattering Coefficient for Shore-to-Air Bistatic High Frequency (HF) Radar Configurations as Applied to Ocean Observations. Remote Sensing. 2019; 11(24):2978. https://doi.org/10.3390/rs11242978 (Year: 2019).*

* cited by examiner

*Primary Examiner* — Timothy A Brainard
*Assistant Examiner* — Ismaaeel A. Siddiquee
(74) *Attorney, Agent, or Firm* — MATTHIAS SCHOLL P.C.; Matthias Scholl

(57) ABSTRACT

The disclosure provides a method for estimating the nondirectional wave spectrum from the sea echoes of multiple HF radar frequencies. The method includes: dividing the radar detection area into a plurality of fan-shaped units at an equal range interval and angle interval according to the distance resolution and the angular resolution of an HF radar; obtaining the Doppler spectrum from the sea echo of a single radar frequency at a fan-shaped unit by performing the first fast Fourier transform (FFT) in distance dimension, the second FFT in Doppler frequency dimension and the digital beamforming; extracting the positive first-order peak and the negative first-order peak from the aforementioned Doppler spectrum by the peak-searching method; and selecting the stronger first-order peak $\sigma_R^{(1)}(\omega)$; dividing the second-order spectrum on the stronger first-order peak side into an inner second-order spectrum and an outer second-order spectrum.

8 Claims, 5 Drawing Sheets

METHOD FOR ESTIMATING NONDIRECTIONAL WAVE SPECTRUM FROM SEA ECHOES OF MULTIPLE HIGH RADAR FREQUENCIES

CROSS-REFERENCE TO RELATED APPLICATIONS

Pursuant to 35 U.S.C.§ 119 and the Paris Convention Treaty, this application claims foreign priority to Chinese Patent Application No. 202110352889.X filed Apr. 1, 2021, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for remote sensing of the ocean surface, and more particularly to a method for estimating the nondirectional wave spectrum from the sea echoes of multiple high frequency (HF) radar frequencies.

In recent years, HF radars are widely used in marine environmental monitoring, which has the characteristics of extensive detection coverage, all-weather, all-day and high measurement accuracy. HF radars transmit the vertical polarization electromagnetic waves that propagate along the ocean surface with little attenuation. The electromagnetic waves interact with the ocean surface to generate Bragg scattering, and then the Doppler spectrum containing the information of the sea state can be obtained. Wave parameters can be retrieved from the Doppler spectrum, including the ocean wave spectrum, the wave height and the wave period, etc. Most existing techniques estimate the wave information by using single-frequency HF radars. Under a high sea state, the second-order part of the Doppler spectrum is prone to be saturated and difficult to be separated from the first-order peak for a high radar frequency. Nevertheless, under a low sea state, the energy of the second-order part is usually low and submerged in the noise floor for a low radar frequency. Therefore, the extraction of wave parameters by using a single-frequency HF radar is not robust enough for the multi-scale wave detection under different sea states, because the measurable range of wave height from the single-frequency data is limited. To broaden the measurable range of wave height and improve the robustness of the measurement under different sea states, it is necessary to directly estimate the nondirectional wave spectrum from the sea echoes of multiple HF radar frequencies.

SUMMARY

Accordingly, it is an object of the disclosure to provide a method for estimating the nondirectional wave spectrum from the sea echoes of multiple HF radar frequencies.

It is another object of the disclosure to provide such a method to solve the problem of limited measurable range of wave height observed at a fixed radar frequency by combining echo signals from multiple HF radar frequencies.

It is a further object of the disclosure to provide such a method to improve the accuracy of measuring the nondirectional wave spectrum and meet the requirements of robustly extracting wave parameters under various sea states.

The disclosure relates to a method for estimating the nondirectional wave spectrum from the sea echoes of multiple HF radar frequencies. The method is carried out in an apparatus which comprises a multi-frequency HF radar and a computer processor. The multi-frequency HF radar comprises a transmitter for transmitting electromagnetic wave signals with multiple frequencies between 3-30 MHz in the HF band to the ocean surface; a receiver for receiving sea echoes of multiple radar frequencies originated from the electromagnetic wave signals modulated by ocean surface movements; and a signal processor unit for obtaining each Doppler spectrum from the sea echo of each radar frequency at a fan-shaped unit by performing a first fast Fourier transform (FFT) in distance dimension, a second FFT in Doppler frequency dimension and a digital beamforming. The computer processor provides code segments for estimating the nondirectional wave spectrum.

The method for estimating the nondirectional wave spectrum from the sea echoes of multiple HF radar frequencies comprises:

(a) dividing the radar detection area into a plurality of fan-shaped units at an equal range interval and angle interval according to a distance resolution and an angular resolution of a multi-frequency HF radar, wherein the multi-frequency HF radar is capable of simultaneously operating at more than one frequency in the HF band;

(b) obtaining a Doppler spectrum from a sea echo of a single radar frequency at a fan-shaped unit by performing a first fast Fourier transform (FFT) in distance dimension, a second FFT in Doppler frequency dimension and a digital beamforming in a signal processor unit, extracting a positive first-order peak and a negative first-order peak from the Doppler spectrum by a peak-searching method and selecting a stronger first-order peak $\sigma_R^{(1)}(\omega)$ from the positive and negative first-order peaks in a computer processor;

(c) dividing a second-order spectrum on a stronger first-order peak side into an inner second-order spectrum and an outer second-order spectrum and separating the outer second-order spectrum on the stronger first-order peak side from the Doppler spectrum in the computer processor according to a Doppler frequency range of the outer second-order spectrum;

(d) calculating $R_f(\omega)$ which is a function of the outer second-order spectrum divided by a first-order peak energy for the stronger side of the Doppler spectrum of the single radar frequency at the fan-shaped unit in the computer processor;

(e) calculating $A_f$ which is defined as a single-frequency coefficient matrix of the nondirectional wave spectrum by linearizing the outer second-order spectrum on the side of the stronger first-order peak in the computer processor;

(f) repeating the above steps (b) to (e), combining the sea echoes of different radar frequencies to construct a matrix R which is a function of the outer second-order spectrum divided by the first-order peak energy for the stronger side of the Doppler spectrum of multiple radar frequencies and merging coefficient matrices of the nondirectional wave spectrum from multiple radar frequencies into a matrix A in the computer processor; and (g) calculating a pseudo-inverse $A^+$ of the matrix A by a singular value decomposition and estimating the nondirectional wave spectrum at the fan-shaped unit from the matrix R and the pseudo-inverse $A^+$ in the computer processor.

In a class of this embodiment, the Doppler spectrum at the fan-shaped unit stated in the step (b) is defined as: $\sigma(\omega)$, where $\omega$ represents a Doppler frequency generated by the motion of ocean waves to the multi-frequency HF radar; and $\sigma(\omega)$ represents a wave energy distribution at the different value of $\omega$.

The positive first-order peak and negative first-order peak are extracted from the Doppler spectrum at the fan-shaped unit using the peak searching method. The first-order peaks are defined as two peaks in the Doppler spectrum which are roughly symmetrically distributed on both sides of zero frequency. The first-order peaks are generated by the Bragg scattering of the waves of half the radar wavelength that are either advancing directly towards the multi-frequency HF radar or receding directly from the multi-frequency HF radar.

The step (b) comprises the steps of:
searching for a point of a maximum amplitude in the Doppler frequency range $[0.6\omega_B, 1.4\omega_B]$ of the Doppler spectrum at the fan-shaped unit as the peak of the positive first-order peak, and recording the Doppler frequency of the peak of the positive first-order peak as $\omega_{P+}$, wherein $\omega_B = \sqrt{2gk_0}$ is a Bragg frequency, wherein $$k_0 = \frac{2\pi f}{c}$$

is a radar wavenumber; c is a speed of light; and f is a radar frequency;
searching for a local minimum point inside the peak of the positive first-order peak where the Doppler frequency meets the inequation $\omega_{P+} - 0.2\omega_B \leq \omega < \omega_{P+}$, and denoting the Doppler frequency of the local minimum point inside the peak of the positive first-order peak as $\omega_{L+}$;
searching for the local minimum point outside the peak of the positive first-order, peak where the Doppler frequency satisfies the inequation $\omega_{P+} < \omega \leq 0.2\omega_B + \omega_{P+}$, and recording the Doppler frequency of the local minimum point outside the peak of the positive first-order peak as $\omega_{R+}$;
intercepting the Doppler spectrum at the fan-shaped unit with Doppler frequency $[\omega_{L+}, \omega_{R+}]$ as the positive first-order peak;
searching for the point of the maximum amplitude in the Doppler frequency range $[-1.4\omega_B, -0.6\omega_B]$ of the Doppler spectrum at the fan-shaped unit as the peak of the negative first-order peak, and recording the Doppler frequency of the peak of the negative first-order peak as $\omega_{P-}$;
searching for the local minimum point inside the peak of the negative first-order peak where the Doppler frequency meets the inequation $\omega_{P-} < \omega \leq \omega_{P-} 0.2\omega_B$, and denoting the Doppler frequency of the local minimum point inside the peak of the negative first-order peak as $\omega_{L-}$;
searching for the local minimum point outside the peak of the negative first-order peak where the Doppler frequency satisfies the inequation $\omega_{P-} - 0.2\omega_B \leq \omega < \omega_{P-}$, and recording the Doppler frequency of the local minimum point outside the peak of the negative first-order peak as $\omega_{R-}$;
intercepting the Doppler spectrum at the fan-shaped unit with Doppler frequency $[\omega_{R-}, \omega_{L-}]$ as the negative first-order peak; and
comparing the amplitude of the peak of the positive first-order peak with that of the negative first-order peak, and selecting the first-order peak with a larger amplitude of the peak point as the stronger first-order peak $\sigma_R^{(1)}(\omega)$.

In a class of this embodiment, in the step (c), the second-order spectrum originated from the second-order scattering of ocean waves and radar waves is a continuum with lower amplitude than the first-order peaks and distributed around the first-order peaks.

The step (c) comprises the steps of:
(1) dividing the second-order spectrum on the stronger first-order peak side into an inner second-order spectrum and an outer second-order spectrum;

The Doppler frequency range of the outer second-order spectrum on the stronger first-order peak side is given as $$\begin{cases} \omega_{c+} < \omega \leq 1.4\omega_B, & \text{when } \sigma_R^{(1)}(\omega) \text{ is the positive first-order peak} \\ -1.4\omega_B \leq \omega_{c-}, & \text{when } \sigma_R^{(1)}(\omega) \text{ is the negative first-order peak} \end{cases}$$

The Doppler frequency range of the inner second-order spectrum on the stronger first-order peak side is given as $$\begin{cases} 0.6\omega_B \leq \omega < \omega_{c+}, & \text{when } \sigma_R^{(1)}(\omega) \text{ is the positive first-order peak} \\ \omega_{c-} < \omega \leq -0.6\omega_B, & \text{when } \sigma_R^{(1)}(\omega) \text{ is the negative first-order peak} \end{cases}$$

where $\omega$ is a Doppler frequency generated by the motion of ocean waves to a radar; $\omega_B = \sqrt{2gk_0}$ is a Bragg frequency; $k_0$ is a radar wavenumber;

$$\omega_{c+} = \frac{\sum_{\omega_{L+}}^{\omega_{R+}} \omega \cdot \sigma_R^{(1)}(\omega)}{\sum_{\omega_{L+}}^{\omega_{R+}} \omega \cdot \sigma_R^{(1)}(\omega)}$$

is a centroid frequency of the positive first-order peak;

and $$\omega_{c-} = \frac{\sum_{\omega_{R-}}^{\omega_{L-}} \omega \cdot \sigma_R^{(1)}(\omega)}{\sum_{\omega_{R-}}^{\omega_{L-}} \omega \cdot \sigma_R^{(1)}(\omega)}$$

is a centroid frequency of the negative first-order peak.

(2) if the stronger first-order peak obtained in the step (b) is the positive first-order peak, taking the centroid frequency $\omega_{c+}$ as a starting point of Doppler frequency, taking a cutoff frequency of $1.4\omega_B$ as an endpoint, extracting the Doppler spectrum at the fan-shaped unit $\sigma(\omega)$ in the frequency range of $(\omega_{c+}, 1.4\omega_B]$, and setting the Doppler spectrum at the fan-shaped unit $\sigma(\omega)$ in the frequency range of $(\omega_{c+}, \omega_{R+}]$ to zero to obtain the outer second-order spectrum on the stronger first-order peak side $\sigma_R^{(2)}(\omega)$;

if the stronger first-order peak obtained in the step (b) is the negative first-order peak, taking the centroid frequency $\omega_{c-}$ as the starting point of Doppler frequency, taking a cutoff frequency of $-1.4\omega_B$ as the endpoint, extracting the Doppler spectrum at the fan-shaped unit $\sigma(\omega)$ in the frequency range of $[-1.4\omega_B, \omega_{c-})$, and setting the Doppler spectrum at the fan-shaped unit $\sigma(\omega)$ in the frequency range of $[\omega_{R-}, \omega_{c-})$ to zero to obtain the outer second-order spectrum on the stronger first-order peak side $\sigma_R^{(2)}(\omega)$.

Preferably, in the step (d), the aforementioned function $R_f(\omega)$ is given by the equation:

$$\begin{cases} R_f(\omega) = \dfrac{\sigma_R^{(2)}(\omega)}{\sum_{\omega_{L+}}^{\omega_{R+}} \sigma_R^{(1)}(\omega)\Delta\omega}, & \text{when } \sigma_R^{(1)}(\omega) \text{ is the positive first-order peak} \\ R_f(\omega) = \dfrac{\sigma_R^{(2)}(\omega)}{\sum_{\omega_{R-}}^{\omega_{L-}} \sigma_R^{(1)}(\omega)\Delta\omega}, & \text{when } \sigma_R^{(1)}(\omega) \text{ is the negative first-order peak} \end{cases}$$

where f in a subscript indicates a radar frequency; $\sigma_R^{(1)}(\omega)$ is the stronger first-order peak; $\sigma_R^{(2)}(\omega)$ is the outer second-order spectrum on the stronger first-order peak side; $\omega_{L+}$ is the Doppler frequency of the local minimum point inside the peak of the positive first-order peak; $\omega_{R+}$ is the Doppler frequency of the local minimum point outside the peak of the positive first-order peak; $\omega_{L-}$ is the Doppler frequency of the local minimum point inside the peak of the negative first-order peak; $\omega_{R-}$ is the Doppler frequency of the local minimum point outside the negative first-order peak; and $\Delta\omega$ is a frequency resolution of the Doppler spectrum $\sigma(\omega)$.

In a class of this embodiment, the step (e) comprises the steps of:

(1) linearizing the outer second-order spectrum on the side of the stronger first-order peak;

at the Doppler frequencies near the first-order peak that satisfy the condition $\omega_B < |\omega| \leq 1.4\omega_B$, the direction of one of the two sets of ocean waves that generate the second-order scattering with the radar vector is approximately equal to that of the Bragg wave vector, so the outer second-order spectrum $\sigma_R^{(2)}(\omega)$ can be linearized as $\sigma_{RL}^{(2)}(\omega)$:

$$\sigma_{RL}^{(2)}(\omega) = \sum_{\theta=0}^{2\pi} 2^8 \pi k_0^4 |\Gamma|^2 S(m\vec{k}) S(-2m'\vec{k_0}) \frac{(2k_0)^4}{k'^4} y^{*3} \left|\frac{\partial y}{\partial h}\right|_{\theta, y=y^*} \cdot \Delta\theta,$$

$$m = m' = 1 \text{ or } -1$$

where $k_0$ is a radar wavenumber; k and k' are the wavenumber of two sets of ocean waves which generate the second-order scattering with the radar wave vector; $\theta$ is an angle between the ocean wave vector $\vec{k}$ and the radar wave vector $\vec{k_0}$; $\Delta\theta$ is a discrete interval of $\theta$; $S(\cdot)$ is a directional wave spectrum; if m=m'=1, $\sigma_R^{(2)}(\omega)$ indicates the outer second-order spectrum on the positive first-order peak side; if m=m'=−1, $\sigma_R^{(2)}(\omega)$ indicates the outer second-order spectrum on the negative first-order peak side; $\Gamma$ is a coupling coefficient; y, y* and h are intermediate variables defined for the convenience of calculation, wherein $y=\sqrt{k}$ and $h = mg^{1/2}y + m'g^{1/2}\sqrt{k'}$, wherein g is the acceleration of gravity; and y* is the solution of constant Doppler frequency contours denoted by $\omega-h=0$.

(2) obtaining $A_f(\theta)$ which is defined as the single-frequency coefficient matrix of the directional wave spectrum by calculating the theoretical value of a function of the linearized outer second-order spectrum $\sigma_{RL}^{(2)}(\omega)$ divided by the stronger first-order peak energy $\sigma_R^{(1)}(\omega)$;

$$\frac{\sigma_{RL}^{(2)}(\omega)}{\sigma_R^{(1)}(\omega_B)} = \sum_{\theta=0}^{2\pi} A_f(\theta) S(m\vec{k}) \Delta\theta,$$

when $\sigma_R^{(1)}(\omega)$ is the positive first-order peak $$\frac{\sigma_{RL}^{(2)}(\omega)}{\sigma_R^{(1)}(-\omega_B)} = \sum_{\theta=0}^{2\pi} A_f(\theta) S(m\vec{k}) \Delta\theta,$$

when $\sigma_R^{(1)}(\omega)$ is the negative first-order peak where $A_f(\theta)$ is the single-frequency coefficient matrix of the directional wave spectrum; f in the subscript is the radar frequency; $S(\cdot)$ is the directional wave spectrum; k is the wavenumber of a set of waves that generate second-order scattering with the radar wave vector; $\theta$ is the angle between the ocean wave vector $\vec{k}$ and the radar wave vector $\vec{k_0}$; $\Delta\theta$ is the discrete interval of $\theta$; $\sigma_R^{(1)}(\omega_B)$ or $\sigma_R^{(1)}(-\omega_B)$ are the theoretical values of the first-order peaks. The theoretical value of the stronger first-order peak is given as:

$\sigma_R^{(1)}(\omega_B) = 2^6 \pi k_0^4 S(-2\vec{k_0})$, when $\sigma_R^{(1)}(\omega)$ is the positive first-order peak $\sigma_R^{(1)}(-\omega_B) = 2^6 \pi k_0^4 S(2\vec{k_0})$, when $\sigma_R^{(1)}(\omega)$ is the negative first-order peak whereby the single-frequency coefficient matrix of the directional wave spectrum $A_f(\theta)$ is given as:

$$A_f(\theta) = |\Gamma|^2 \frac{4(2k_0)^4 y^{*3}}{(k')^4} \left|\frac{\partial y}{\partial h}\right|_{\theta, y=y^*}$$

where $\Gamma$ is the coupling coefficient; $k_0$ is the radar wavenumber; k' is the wavenumber of a set of ocean waves which generate the second-order scattering with the radar wave vector; $\theta$ is the angle between the ocean wave vector $\vec{k}$ and the radar wave vector $\vec{k_0}$; y, y* and h are intermediate variables defined for the convenience of calculation, wherein $y=\sqrt{k}$ and $h=mg^{1/2}y+m'g^{1/2}\sqrt{k'}$, wherein g is the acceleration of gravity; and y* is the solution of constant Doppler frequency contours denoted by $\omega-h=0$.

(3) calculating $A_f$ which is defined as the single-frequency coefficient matrix of the nondirectional wave spectrum by discretizing $\theta$ into n pieces at equal intervals and summing all terms of $\theta$ in the following equation:

$$A_f = \sum_{\theta=0}^{2\pi} A_f(\theta) G(\theta) \Delta\theta$$

where $A_f(\theta)$ is the single-frequency coefficient matrix of the directional wave spectrum; f in the subscript is the radar frequency; $\theta$ is the angle between the ocean wave vector $\vec{k}$ and the radar wave vector $\vec{k_0}$; $\Delta\theta = \dfrac{2\pi}{n}$ is the discrete interval of θ; G(θ) is the direction distribution function of the directional wave spectrum.

In a class of this embodiment, the step (f) comprises the step of:

merging $R_f(\omega)$ which is defined as the function of the outer second-order spectrum divided by the first-order peak energy for the stronger side of the Doppler spectrum of each frequency and $A_f$ which is defined as the single-frequency coefficient matrix of the nondirectional wave spectrum into a matrix R and a matrix A respectively according to the following equation:

$$R = [R_{f_1}(\omega) R_{f_2}(\omega) R_{f_3}(\omega) R_{f_4}(\omega)]^T$$

$$A = [A_{f_1} A_{f_2} A_{f_3} A_{f_4}]^T$$

where $R_{f_1}(\omega)$, $R_{f_2}(\omega)$, $R_{f_2}(\omega)$ and $R_{f_2}(\omega)$ are the functions of the outer second-order spectrum to the first-order peak energy for the stronger side of the Doppler spectrum extracted from the sea echoes of radar frequencies $f_1$, $f_2$, $f_3$, and $f_4$, respectively; $A_{f_1}$, $A_{f_2}$, $A_{f_3}$, and $A_{f_4}$ are the coefficient matrices of the nondirectional wave spectrum from the sea echoes of radar frequencies $f_1$, $f_2$, $f_3$ and $f_4$, respectively.

In a class of this embodiment, the aforementioned nondirectional wave spectrum in the step (g) is given by the equation:

$$S(k) = A^+ R$$

Because the matrix A is not square, only the pseudo-inverse of the matrix A can be calculated. A singular value decomposition can be carried out on the matrix A to obtain its pseudo-inverse, and then the nondirectional wave spectrum S(k) can be estimated from the matrix R and the matrix $A^+$.

Compared with the prior art, the method for estimating the nondirectional wave spectrum from the sea echoes of multiple HF radar frequencies has the superiority that it solves the problem of limited measurable range of wave height observed at a fixed radar frequency by combining echo signals from multiple radar frequencies, whereby the accuracy of the method for measuring the nondirectional wave spectrum is improved and the method can adapt to the complex and changeable sea surface and meet the requirements of robustly extracting wave parameters under various sea states.

BRIEF DESCRIPTION OF THE DRAWINGS

The disclosure will be more clearly understood from the following description when read in conjunction with the accompanying drawings of which.

DETAILED DESCRIPTION

Figure 5:
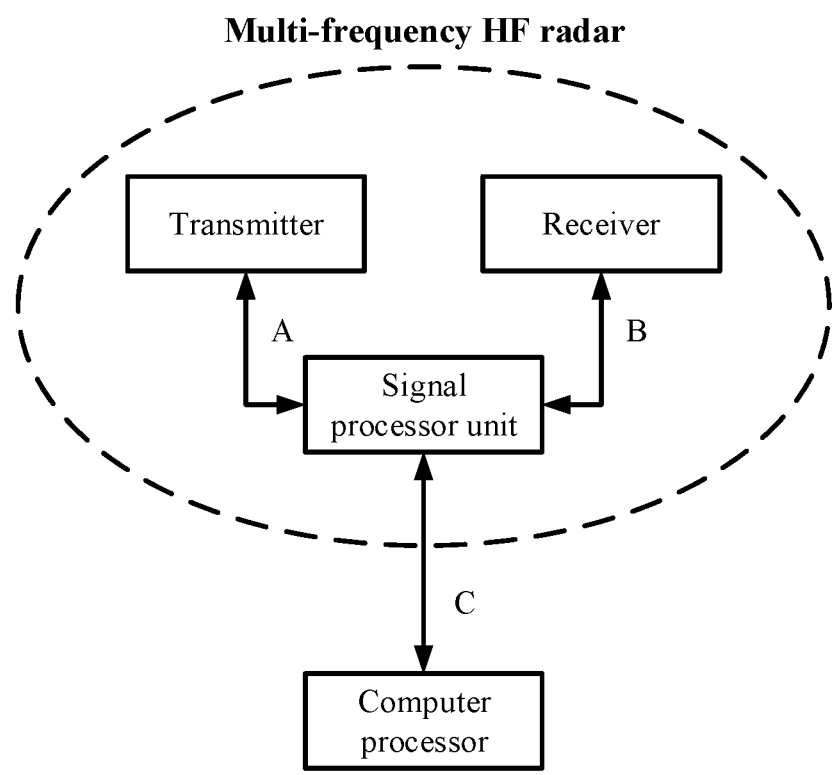
FIG. 5 shows a block diagram of an apparatus for carrying out the method for directly estimating the nondirectional wave spectrum from the sea echoes of multiple HF radar frequencies according to an embodiment of the disclosure.

FIG. 5 shows a block diagram of an apparatus for carrying out a method for estimating the nondirectional wave spectrum from the sea echoes of multiple HF radar frequencies. The apparatus comprises a multi-frequency HF radar and a computer processor. The multi-frequency HF radar comprises a transmitter, a receiver and a signal processor unit. The transmitter transmits electromagnetic wave signals of multiple frequencies between 3-30 MHz in the HF band to the sea surface. The receiver receives sea echoes from multiple radar frequencies originated from the electromagnetic wave signals modulated by ocean surface movements. The signal processor unit obtains each Doppler spectrum from the sea echo of each radar frequency at a fan-shaped unit by performing a first fast Fourier transform (FFT) in distance dimension, a second FFT in Doppler frequency dimension and a digital beamforming. The computer processor provides code segments for carrying out the method for estimating the nondirectional wave spectrum. The transmitter and receiver are respectively connected to the signal processor unit through communication links A and B to realize the full-duplex communication. The signal processor unit is connected to the computer processor through the communication link C to realize the full-duplex communication. Communication links A and B include but are not limited to a wireless connection and a hardwired connection. Communication link C is a network connection, such as Transmission Control Protocol/Internet Protocol (TCP/IP). The multi-frequency HF radar and the computer processor may be installed far away from each other.

In operation, the signal processor unit may control the transmitter to transmit frequency modulated interrupted continuous wave (FMICW) chirps to the ocean surface through the link A. In a Doppler sampling period, the transmitter may transmit FMICW chirps with different frequencies in chronological order, and then the receiver receives sea echoes modulated by ocean surface movements with corresponding frequencies. The receiver communicates with the signal processor unit through the link B and sends the received sea echo to the signal processor unit. The signal processor unit performs the first FFT in distance dimension and the second FFT in Doppler frequency dimension and the digital beamforming to obtain the Doppler spectrum in a fan-shaped unit. The signal processor unit sends the Doppler spectrum in a fan-shaped unit to the computer processor through the link C, and then the code segments for estimating the nondirectional wave spectrum provided by the computer processor are executed.

Figure 1:
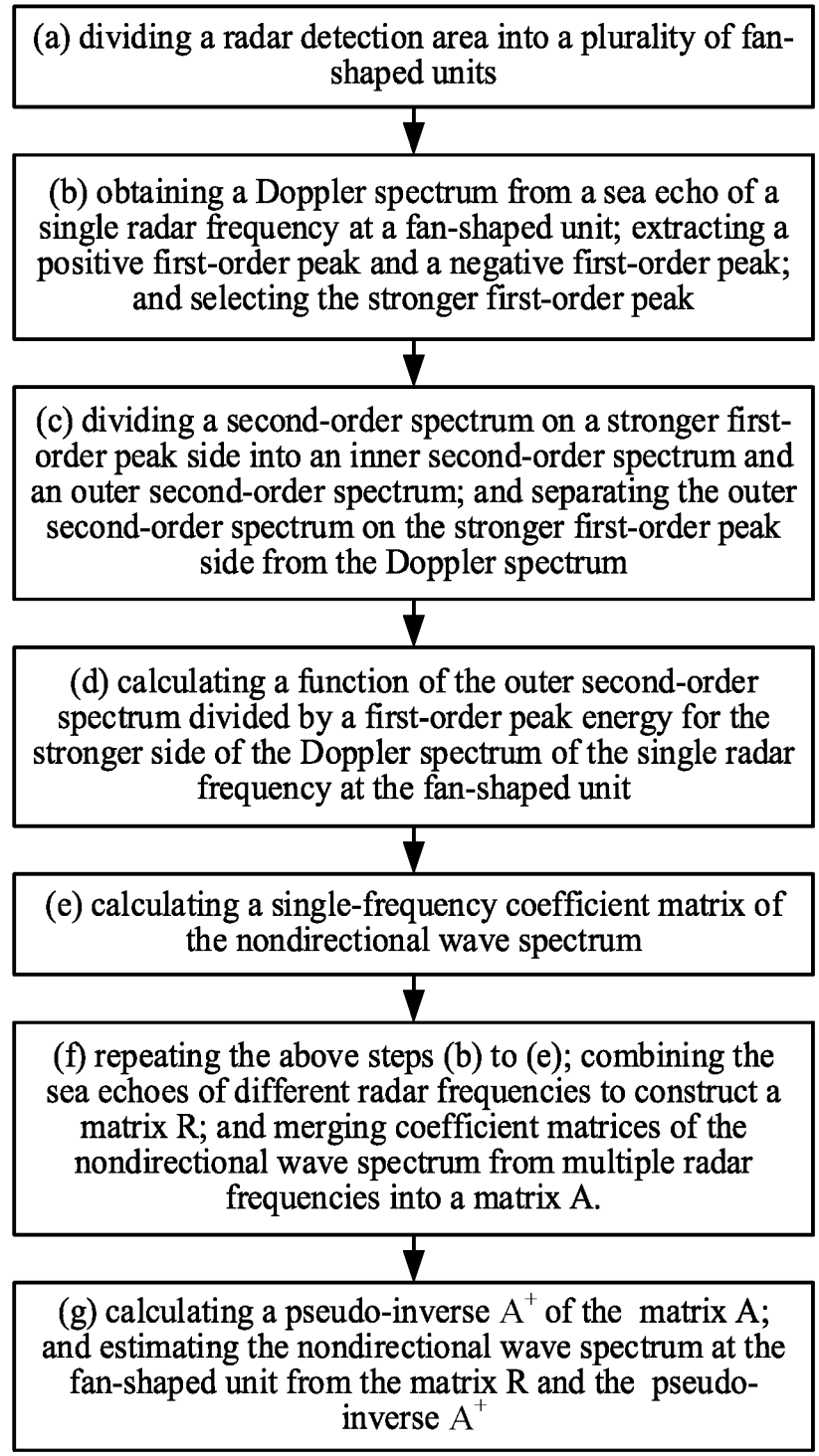
FIG. 1 is a flow chart showing the method for directly estimating the nondirectional wave spectrum from the sea echoes of multiple HF radar frequencies according to an embodiment of the disclosure.
Figure 2A:
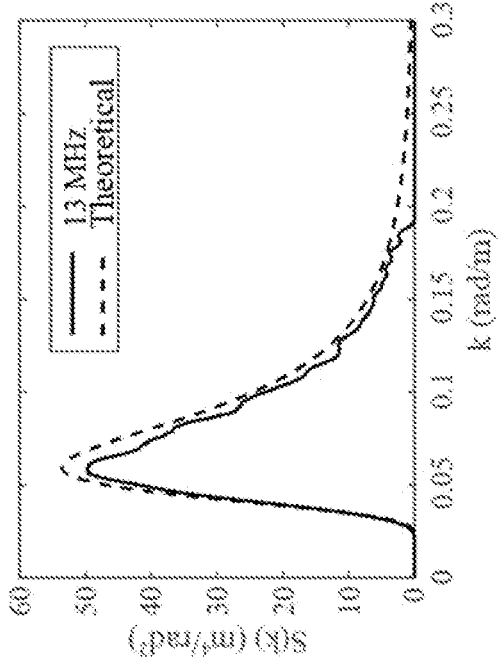
FIGS. 2A-2D are graphs showing the comparison between the nondirectional wave spectrum estimated from the simulated sea echoes of a single radar frequency and the theoretical wave spectrum according to an embodiment of the disclosure.
Figure 2B:
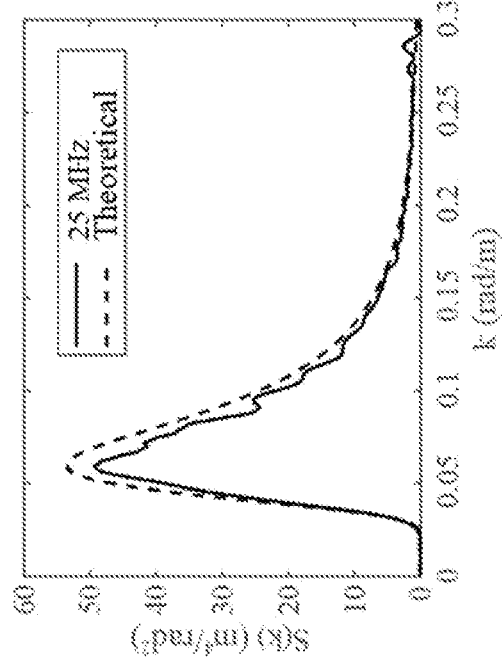
Figure 2C:
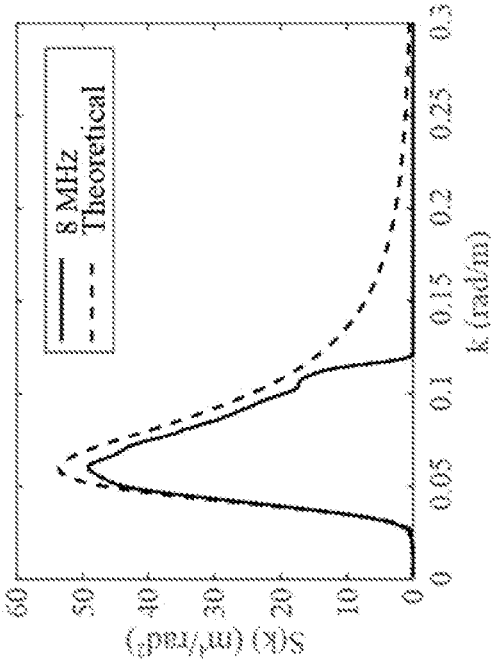
Figure 2D:
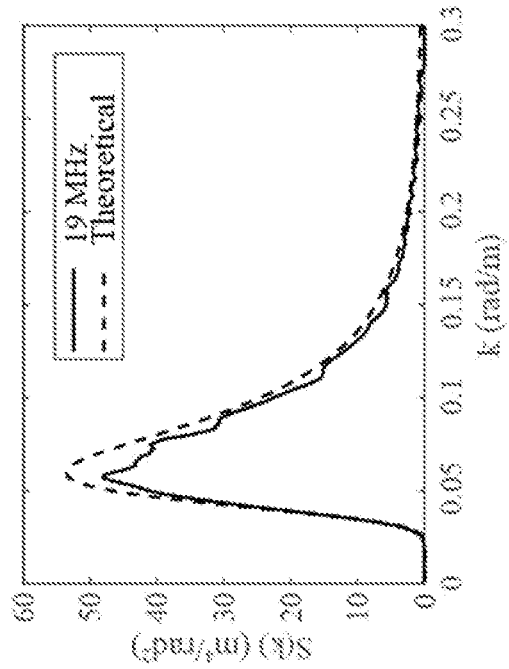

FIG. 1 show the outlined steps of the method for estimating the nondirectional wave spectrum from the sea echoes of multiple HF radar frequencies, comprising the following steps (a)-(g).

The step (a) is dividing a radar detection area into a plurality of fan-shaped units at an equal range interval and angle interval according to a distance resolution and an angular resolution of a multi-frequency HF radar, wherein the multi-frequency HF radar is capable of simultaneously operating at more than one frequency in the HF band.

The step (b) is obtaining a Doppler spectrum from a sea echo of a single radar frequency at a fan-shaped unit by performing a first fast FFT in distance dimension, a second FFT in Doppler frequency dimension and a digital beamforming in a signal processor unit, extracting a positive first-order peak and a negative first-order peak from the Doppler spectrum by a peak-searching method and selecting a stronger first-order peak $\sigma_R^{(1)}(\omega)$ from the positive and negative first-order peaks in a computer processor.

In the step (b), the Doppler spectrum at the fan-shaped unit is defined as: $\sigma(\omega)$, where $\omega$ represents a Doppler frequency generated by the motion of ocean waves to the multi-frequency HF radar; and $\sigma(\omega)$ represents a wave energy distribution at the different value of $\omega$.

The positive first-order peak and negative first-order peak are extracted from the Doppler spectrum at the fan-shaped unit using the peak searching method. The first-order peaks are defined as two peaks in the Doppler spectrum which are roughly symmetrically distributed on both sides of zero frequency. The first-order peaks are generated by the Bragg scattering of the waves of half the radar wavelength that are either advancing directly towards the multi-frequency HF radar or receding directly from the multi-frequency HF radar The detailed steps of the step (b) are as follows:
  searching for a point of a maximum amplitude in the Doppler frequency range $[0.6\omega_B, 1.4\omega_B]$ of the Doppler spectrum at the fan-shaped unit as the peak of the positive first-order peak, and recording the Doppler frequency of the peak of the positive first-order peak as $\omega_{P+}$, wherein $\omega_B = \sqrt{2gk_0}$ is a Bragg frequency, wherein $$k_0 = \frac{2\pi f}{c}$$

is a radar wavenumber; c is a speed of light; and f is a radar frequency;
  searching for a local minimum point inside the peak of the positive first-order peak where the Doppler frequency meets the inequation $\omega_{P+} - 0.2\omega_B \leq \omega < \omega_{P+}$, and denoting the Doppler frequency of the local minimum point inside the peak of the positive first-order peak as $\omega_{L+}$;
  searching for the local minimum point outside the peak of the positive first-order peak where the Doppler frequency satisfies the inequation $\omega_{P+} < (\omega) \leq 0.2\omega_B + \omega_{P+}$, and recording the Doppler frequency of the local minimum point outside the peak of the positive first-order peak as $\omega_{R+}$;
  intercepting the Doppler spectrum at the fan-shaped unit with Doppler frequency $[\omega_{L+}, \omega_{R+}]$ as the positive first-order peak;
  searching for the point of the maximum amplitude in the Doppler frequency range $[-1.4\omega_B, -0.6\omega_B]$ of the Doppler spectrum at the fan-shaped unit as the peak of the negative first-order peak, and recording the Doppler frequency of the peak of the negative first-order peak as $\omega_{P-}$;
  searching for the local minimum point inside the peak of the negative first-order peak where the Doppler frequency meets the inequation $\omega_{P-} < \omega \leq \omega_{P-} + 0.2\omega_B$, and denoting the Doppler frequency of the local minimum point inside the peak of the negative first-order peak as $\omega_{L-}$;
  searching for the local minimum point outside the peak of the negative first-order peak where the Doppler frequency satisfies the inequation $\omega_{P-} - 0.2\omega_B \leq \omega < \omega_{P-}$, and recording the Doppler frequency of the local minimum point outside the peak of the negative first-order peak as $\omega_{R-}$;
  intercepting the Doppler spectrum at the fan-shaped unit with Doppler frequency $[\omega_{R-}, \omega_{L-}]$ as the negative first-order peak; and
  comparing the amplitude of the peak of the positive first-order peak with that of the negative first-order peak, and selecting the first-order peak with a larger amplitude of the peak point as the stronger first-order peak $\sigma_R^{(1)}(\omega)$.

The step (c) is dividing a second-order spectrum on the stronger first-order peak side into an inner second-order spectrum and an outer second-order spectrum, and separating the outer second-order spectrum on the stronger first-order peak side from the Doppler spectrum in the computer processor according to a Doppler frequency range of the outer second-order spectrum;

In the step (c), the second-order spectrum originated from the second-order scattering of ocean waves and radar waves is a continuum with lower amplitude than the first-order peaks and distributed around the first-order peaks.

The step (c) comprises the following sub-steps:
  dividing the second-order spectrum on the stronger first-order peak side into an inner second-order spectrum and an outer second-order spectrum;
  The Doppler frequency range of the outer second-order spectrum on the stronger first-order peak side is given as $$\begin{cases} \omega_{c+} < \omega \leq 1.4\omega_B, & \text{when } \sigma_R^{(1)}(\omega) \text{ is the positive first-order peak} \\ -1.4\omega_B \leq \omega < \omega_{c-}, & \text{when } \sigma_R^{(1)}(\omega) \text{ is the negative first-order peak} \end{cases}$$

The Doppler frequency range of the inner second-order spectrum on the stronger first-order peak side is given as $$\begin{cases} 0.6\omega_B \leq \omega < \omega_{c+}, & \text{when } \sigma_R^{(1)}(\omega) \text{ is the positive first-order peak} \\ \omega_{c-} < \omega \leq -0.6\omega_B, & \text{when } \sigma_R^{(1)}(\omega) \text{ is the negative first-order peak} \end{cases}$$

where $\omega$ is a Doppler frequency generated by the motion of ocean waves to the multi-frequency HF radar; $\omega_B = \sqrt{2gk_0}$ is a Bragg frequency; $k_0$ is the radar wavenumber;

$$\omega_{c+} = \frac{\sum_{\omega_{L+}}^{\omega_{R+}} \omega \cdot \sigma_R^{(1)}(\omega)}{\sum_{\omega_{L+}}^{\omega_{R+}} \sigma_R^{(1)}(\omega)}$$

is a centroid frequency of the positive first-order peak; and $$\omega_{c-} = \frac{\sum_{\omega_{R-}}^{\omega_{L-}} \omega \cdot \sigma_R^{(1)}(\omega)}{\sum_{\omega_{R-}}^{\omega_{L-}} \sigma_R^{(1)}(\omega)}$$

is a centroid frequency of the negative first-order peak.

if the stronger first-order peak obtained in the step (b) is the positive first-order peak, taking the centroid frequency $\omega_{c+}$ as a starting point of Doppler frequency, taking a cutoff frequency of $1.4\omega_B$ as an endpoint, extracting the Doppler spectrum $\sigma(\omega)$ at the fan-shaped unit in the frequency range of $(\omega_{c+}, 1.4\omega_B]$, and setting the Doppler spectrum $\sigma(\omega)$ at the fan-shaped unit in the frequency range of $(\omega_{c+}, \omega_{R+}]$ to zero to obtain the outer second-order spectrum on the stronger first-order peak side $\sigma_R^{(2)}(\omega)$;

if the stronger first-order peak obtained in the step (b) is the negative first-order peak, taking the centroid frequency $\omega_{c-}$ as the starting point of Doppler frequency, taking a cutoff frequency of $-1.4\omega_B$ as the endpoint, extracting the Doppler spectrum $\sigma(\omega)$ at the fan-shaped unit in the frequency range of $[-1.4\omega_B, \omega_{c-})$, and setting the Doppler spectrum $\sigma(\omega)$ at the fan-shaped unit in the frequency range of $[\omega_{R-}, \omega_{c-})$ to zero to obtain the outer second-order spectrum on the stronger first-order peak side $\sigma_R^{(2)}(\omega)$.

The step (d) is calculating $R_f(\omega)$ which is a function of the outer second-order spectrum divided by a first-order peak energy for the stronger side of the Doppler spectrum of the single radar frequency at the fan-shaped unit in the computer processor. The function $R_f(\omega)$ can be given as $$\begin{cases} R_f(\omega) = \dfrac{\sigma_R^{(2)}(\omega)}{\sum_{\omega_{L+}}^{\omega_{R+}} \sigma_R^{(1)}(\omega)\Delta\omega}, \text{ when } \sigma_R^{(1)}(\omega) \text{ is the positive first-order peak} \\ R_f(\omega) = \dfrac{\sigma_R^{(2)}(\omega)}{\sum_{\omega_{R-}}^{\omega_{L-}} \sigma_R^{(1)}(\omega)\Delta\omega}, \text{ when } \sigma_R^{(1)}(\omega) \text{ is the negative first-order peak} \end{cases}$$

where f in a subscript indicates a radar frequency; $\sigma_R^{(1)}(\omega)$ is the stronger first-order peak; $\sigma_R^{(2)}(\omega)$ is the outer second-order spectrum on the stronger first-order peak side; $\omega_{L+}$ is the Doppler frequency of the local minimum point inside the peak point of the positive first-order peak; $\omega_{R+}$ is the Doppler frequency of the local minimum point outside the peak point of the positive first-order peak; $\omega_{L-}$ is the Doppler frequency of the local minimum point inside the peak point of the negative first-order peak; $\omega_{R-}$ is the Doppler frequency of the local minimum point outside the peak point of the negative first-order peak; and $\Delta\omega$ is a frequency resolution of the Doppler spectrum $\sigma(\omega)$.

The step (e) is calculating the single-frequency coefficient matrix of the nondirectional wave spectrum by linearizing the outer second-order spectrum on the side of the stronger first-order peak in the computer processor.

The step of calculating the single-frequency coefficient matrix of the nondirectional wave spectrum comprises:

linearizing the outer second-order spectrum on the side of the stronger first-order peak;

at the Doppler frequencies near the first-order peak that satisfy the condition $\omega_B < |\omega| \leq 1.4\omega_B$, the direction of one of the two sets of ocean waves that generate the second-order scattering with the radar vector is approximately equal to that of the Bragg wave vector, so the outer second-order spectrum $\sigma_R^{(2)}(\omega)$ can be linearized as $\sigma_{RL}^{(2)}(\omega)$:

$$\sigma_{RL}^{(2)}(\omega) = \sum_{\theta=0}^{2\pi} 2^8 \pi k_0^4 |\Gamma|^2 S(m\vec{k}) S\left(-2m'\vec{k_0}\right) \frac{(2k_0)^4}{k'^4} y^{*3} \left|\frac{\partial y}{\partial h}\right|_{\theta, y=y^*} \cdot \Delta\theta,$$

$$m = m' = 1 \text{ or } -1$$

where $$k_0 = \frac{2\pi f}{c}$$

is a radar wavenumber; $k=(0,0.3]$ and $k'=(k^2+4kk_0 \cos\theta+(2k_0)^2)^{1/2}$ are the wavenumber of two sets of ocean waves which generate the second-order scattering with the radar wave vector $\vec{k_0}$; $\theta=[0,2\pi]$ is an angle between the ocean wave vector $\vec{k}$ and the radar wave vector $\vec{k_0}$; $\Delta\theta$ is a discrete interval of $\theta$; $S(\vec{\cdot})$ is a directional wave spectrum; if $m=m'=1$, $\sigma_R^{(2)}(\omega)$ indicates the outer second-order spectrum on the positive first-order peak side; if $m=m'=-1$, $\sigma_R^{(2)}(\omega)$ indicates the outer second-order spectrum on the negative first-order peak side;

$$\Gamma = \frac{1}{2}\left[\frac{(\vec{k}\cdot\vec{k_0})(\vec{k'}\cdot\vec{k_0})/k_0^2 - 2\vec{k}\cdot\vec{k'}}{\sqrt{\vec{k}\cdot\vec{k'}} - k_0\Delta}\right] - \frac{i}{2}\left[k + k' - \frac{(kk' - \vec{k}\cdot\vec{k'})(\omega^2 + \omega_B^2)}{mm'\sqrt{kk'}(\omega^2 - \omega_B^2)}\right]$$

is a coupling coefficient, wherein m, m', $k_0$, k, k', $\vec{k}$ and $\vec{k_0}$ are the same as described above, $\vec{k}$ is one of two sets of ocean waves which generate the second-order scattering with the radar wave vector $\vec{k_0}$, $\omega$ is the Doppler frequency, $\omega_B = \sqrt{2gk_0}$ is the Bragg frequency, i is an imaginary unit and $\Delta$ is the normalized impedance of sea surface; y, y* and h are intermediate variables defined for the convenience of calculation, wherein $y = \sqrt{k}$ and $h = mg^{1/2}y + m'g^{1/2}\sqrt{k'}$, wherein g is the acceleration of gravity; and y* is the solution of constant Doppler frequency contours denoted by $\omega - h = 0$.

(2) obtaining $A_f(\theta)$ which is defined as the single-frequency coefficient matrix of the directional wave spectrum by calculating the theoretical value of a function of the linearized outer second-order spectrum $\sigma_R^{(2)}(\omega)$ divided by the stronger first-order peak energy $\sigma_R^{(1)}(\omega)$.

$$\frac{\sigma_{RL}^{(2)}(\omega)}{\sigma_R^{(1)}(\omega_B)} = \sum_{\theta=0}^{2\pi} A_f(\theta) S(m\vec{k}) \Delta\theta,$$

when $\sigma_R^{(1)}(\omega)$ is the positive first-order peak $$\frac{\sigma_{RL}^{(2)}(\omega)}{\sigma_R^{(1)}(-\omega_B)} = \sum_{\theta=0}^{2\pi} A_f(\theta) S(m\vec{k}) \Delta\theta,$$

when $\sigma_R^{(1)}(\omega)$ is the negative first-order peak where $A_f(\theta)$ is the single-frequency coefficient matrix of the directional wave spectrum; f in the subscript is the radar frequency; $S(\vec{\cdot})$ is the directional wave spectrum; k is the wavenumber of a set of waves that generate second-order scattering with the radar wave vector;

$\theta=[0,2\pi]$ is the angle between the ocean wave vector $\vec{k}$ and the radar wave vector $\vec{k_0}$; $\Delta\theta$ is the discrete interval of $\theta$; $\sigma_R^{(1)}(\omega_B)$ or $\sigma_R^{(1)}(-\omega_B)$ is the theoretical value of the first-order peaks. The theoretical value of the stronger first-order peak is given as:

$\sigma_R^{(1)}(\omega_B)=2^6\pi k_0^4 S(-2\vec{k_0})$, when $\sigma_R^{(1)}(\omega)$ is the positive first-order peak $\sigma_R^{(1)}(-\omega_B)=2^6\pi k_0^4 S(2\vec{k_0})$, when $\sigma_R^{(1)}(\omega)$ is the negative first-order peak whereby the single-frequency coefficient matrix of the directional wave spectrum $A_f(\theta)$ is given as:

$$A_f(\theta) = |\Gamma|^2 \frac{4(2k_0)^4 y^{*3}}{(k')^4}\left|\frac{\partial y}{\partial h}\right|_{\theta, y=y^*}$$

where $$\Gamma = \frac{1}{2}\left[\frac{(\vec{k}\cdot\vec{k_0})(\vec{k'}\cdot\vec{k_0})/k_0^2 - 2\vec{k}\cdot\vec{k'}}{\sqrt{\vec{k}\cdot\vec{k'}} - k_0\Delta}\right] - \frac{i}{2}\left[k+k' - \frac{(kk' - \vec{k}\cdot\vec{k'})(\omega^2+\omega_B^2)}{mm'\sqrt{kk'}(\omega^2-\omega_B^2)}\right]$$

is the coupling coefficient;

$$k_0 = \frac{2\pi f}{c}$$

is the radar wavenumber;
$k'=(k^2+4kk_0 \cos\theta+(2k_0)^2)^{1/2}$ is the wavenumber of a set of ocean waves which generate the second-order scattering with the radar wave vector; $\theta-[0,2\pi]$ is the angle between the ocean wave vector $\vec{k}$ and the radar wave vector $\vec{k_0}$; y, y* and h are intermediate variables defined for the convenience of calculation, wherein $y=\sqrt{k}$ and $h=mg^{1/2}y+m'g^{1/2}\sqrt{k'}$, wherein g is the acceleration of gravity; and y* is the solution of constant Doppler frequency contours denoted by $\omega-h=0$.

(3) calculating $A_f$ which is defined as the single-frequency coefficient matrix of the nondirectional wave spectrum by discretizing $\theta$ into n pieces at equal intervals and summing all terms of $\theta$ in the following equation:

$$A_f = \sum_{\theta=0}^{2\pi} A_f(\theta)G(\theta)\Delta\theta$$

where $A_f(\theta)$ is the single-frequency coefficient matrix of the directional wave spectrum; f in the subscript is the radar frequency; $\theta-[0,2\pi]$ is the angle between the ocean wave vector $\vec{k}$ and the radar wave vector $\vec{k_0}$; $\Delta\theta = \frac{2\pi}{n}$ is the discrete interval of $\theta$; $G(\theta)$ is the direction distribution function of the directional wave spectrum. The cardioid distribution function $$G(\theta) = \cos^{2s}\left(\frac{\theta-\theta^*}{2}\right)\bigg/\int_{-\pi}^{\pi}\cos^{2s}\left(\frac{\theta}{2}\right)d\theta$$

can be selected, where $\theta^*$ is the wind direction and s=2 is the spread factor.

The step (f) is repeating the above steps (b) to (e); combining the sea echoes of different radar frequencies to construct a matrix R which is a function of the outer second-order spectrum divided by the first-order peak energy for the stronger side of the Doppler spectrum of multiple radar frequencies and merging coefficient matrices of the nondirectional wave spectrum from multiple radar frequencies into a matrix A in the computer processor.

The detailed process of the step (f) is as follows:

$R_f(\omega)$ which is defined as the function of the outer second-order spectrum divided by the first-order peak energy for the stronger side of the Doppler spectrum of each frequency and $A_f$ which is defined as the single-frequency coefficient matrix of the nondirectional wave spectrum are merged into a matrix R and a matrix A respectively according to the following equation:

$R=[R_{f_1}(\omega)R_{f_2}(\omega)R_{f_3}(\omega)R_{f_4}(\omega)]^T$ $A=[A_{f_1}A_{f_2}A_{f_3}A_{f_4}]^T$ where $R_{f_1}(\omega)$, $R_{f_2}(\omega)$, $R_{f_3}(\omega)$ and $R_{f_4}(\omega)$ are the functions of the outer second-order spectrum divided by the first-order peak energy for the stronger side of the Doppler spectrum extracted from the sea echoes of radar frequencies $f_1$, $f_2$, $f_3$ and $f_4$, respectively; and $A_{f_1}$, $A_{f_2}$, $A_{f_3}$, and $A_{f_4}$ are the coefficient matrices of the nondirectional wave spectrum from the sea echoes of radar frequencies fj, $f_3$ and $f_4$ respectively.

The step (g) is calculating the pseudo-inverse $A^+$ of the matrix A by a singular value decomposition; and estimating the nondirectional wave spectrum at the fan-shaped unit from the matrix R and the pseudo-inverse $A^+$ in the computer processor.

The aforementioned nondirectional wave spectrum in the step (g) is given by the equation:

$S(k)=A^+R$

Because the matrix A is not square, only the pseudo-inverse of the matrix A can be calculated. The singular value decomposition can be carried out on the matrix A to obtain its pseudo-inverse, and then the nondirectional wave spectrum $S(k)$ can be estimated from the matrix R and the matrix $A^+$.

Figure 3:
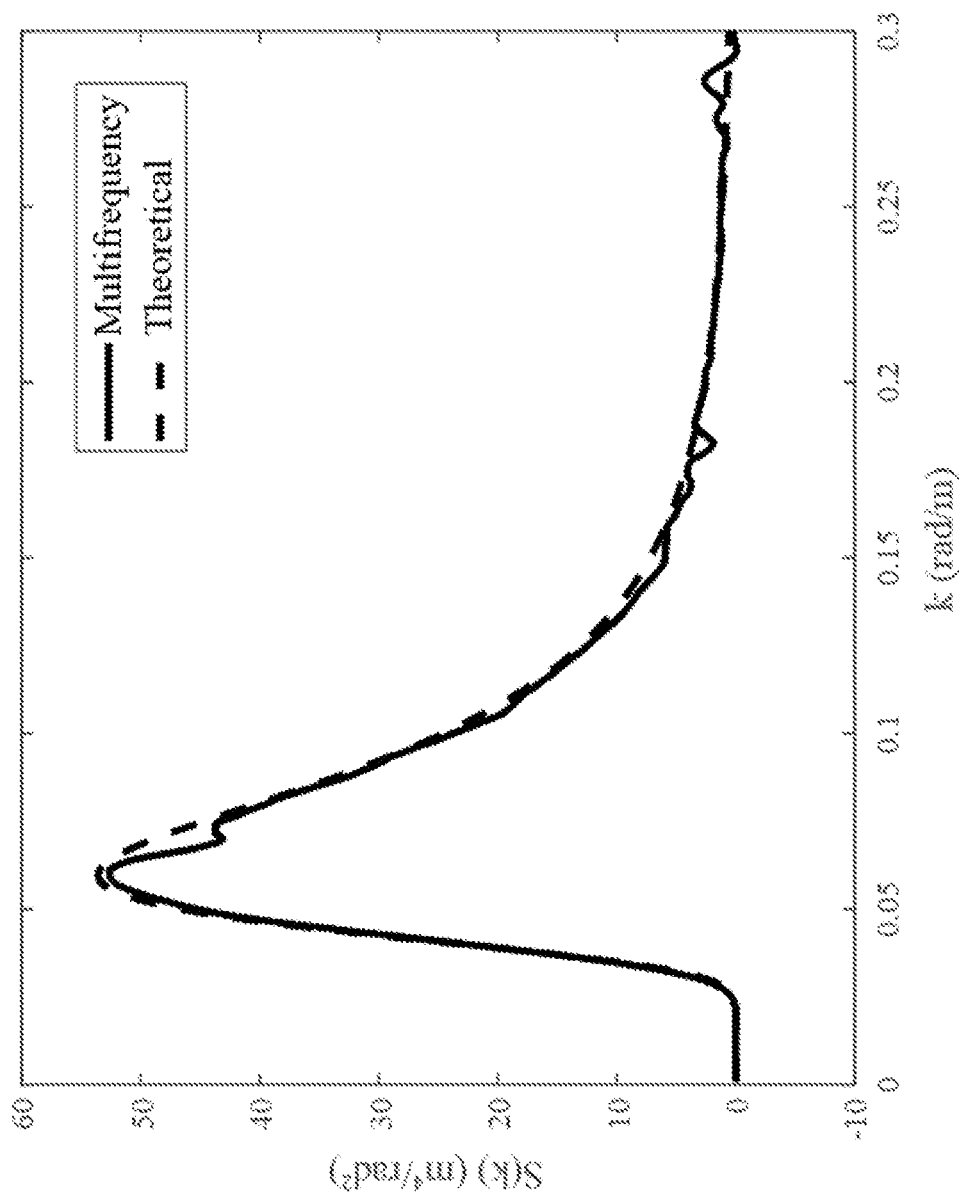
FIG. 3 is a graph showing the comparison between the nondirectional wave spectrum estimated from the simulated sea echoes of multiple radar frequencies and the theoretical wave spectrum according to an embodiment of the disclosure.

As an example, the Pierson-Moskowitz (PM) spectrum and the cardioid distribution function are selected to simulate the Doppler spectrum of the sea echoes of radar frequency 8 MHz, 13 MHz, 19 MHz and 25 MHz respectively. The wind speed is set to 10 m/s, and the wind direction is set to 135°. The comparison between the nondirectional wave spectrum estimated from the simulated sea echoes of a single radar frequency and the theoretical wave spectrum is shown in FIGS. 2A-2D. As shown in FIG. 3 the nondirectional wave spectrum estimated from the sea echoes of multiple radar frequencies is in good agreement with that of the theoretical values. FIGS. 2A-2D and FIG. 3 demonstrate that the estimation result of the nondirectional wave spectrum from the multiple frequencies provides reasonable agreement with the theoretical values compared with that from the sea echoes at 8 MHz, 13 MHz, 19 MHz, and 25 MHz.

Figure 4A:
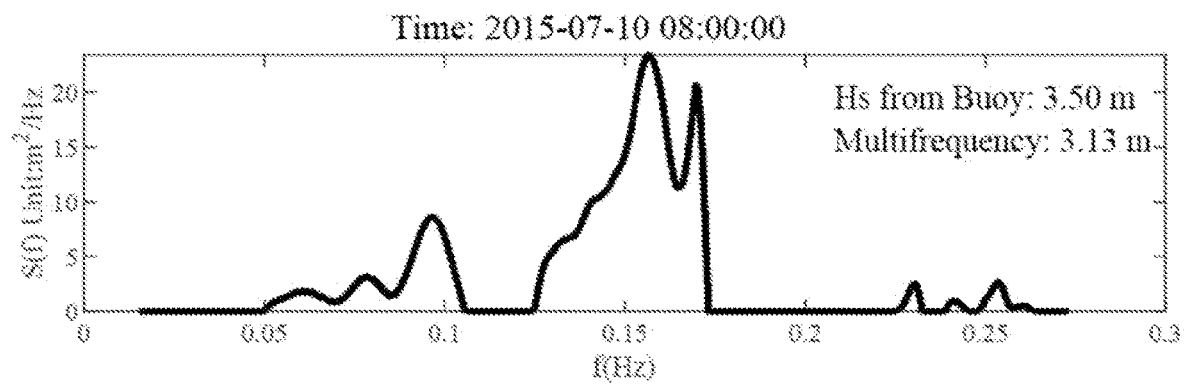
FIGS. 4A-4C are graphs showing the comparison among the nondirectional wave spectra estimated from the sea echoes collected by a multi-frequency HF radar system according to an embodiment of the disclosure.
Figure 4B:
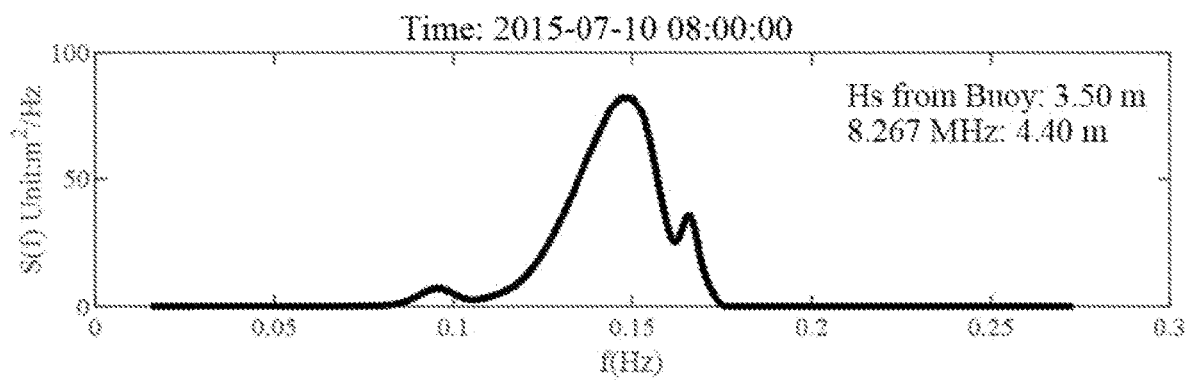
Figure 4C:
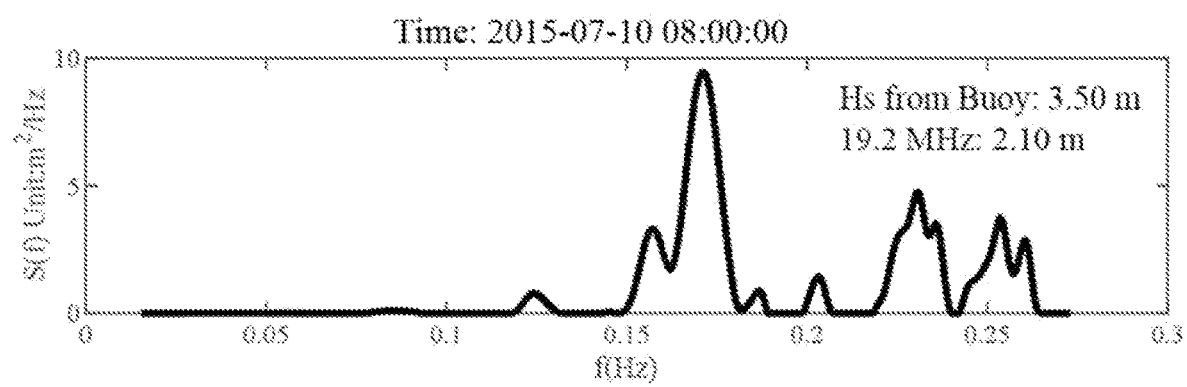

The method provided by the disclosure is applied to a dataset collected by a multi-frequency HF radar system operating at 8.267 MHz and 19.2 MHz. The wave height estimated by the method from the radar data is compared with that measured by a buoy to evaluate the performance of the method. The comparison among the nondirectional wave spectra estimated from the sea echoes collected with a multi-frequency HF radar system at 08:00 AM on Jul. 10, 2015 is shown in FIGS. 4A-4C. The wave height extracted by the nondirectional wave spectrum directly estimated from the multifrequency data is more consistent with that measured by the buoy than that estimated from the single-frequency data.

The method provided by the disclosure for directly estimating the nondirectional wave spectrum from the sea echoes of multiple HF radar frequencies breaks through the limitation of the sea states that can be detected at a fixed radar frequency by combining echo signals from multiple radar frequencies, whereby the robustness and accuracy of estimating the nondirectional wave spectrum are greatly enhanced and the potential of the method for monitoring the complicated and changeable sea surface is recognized. Therefore, it is feasible to estimate the nondirectional wave spectrum from the sea echoes of multiple HF radar frequencies, and it has higher accuracy and wide application prospect compared with the conventional method for inverting the nondirectional wave spectrum from the single-frequency sea echo.

It will be obvious to those skilled in the art that changes and modifications may be made, and therefore, the aim in the appended claims is to cover all such changes and modifications.

What is claimed is:

1. A method for directly estimating a nondirectional wave spectrum from sea echoes of multiple high frequency (HF) radar frequencies, the method comprising:
   (a) dividing a radar detection area into a plurality of fan-shaped units at an equal range interval and angle interval according to a distance resolution and an angular resolution of a multi-frequency HF radar, wherein the multi-frequency HF radar is capable of simultaneously operating at more than one frequency in the HF band;
   (b) obtaining a Doppler spectrum from a sea echo of a single radar frequency at a fan-shaped unit by performing a first fast Fourier transform (FFT) in distance dimension, a second FFT in Doppler frequency dimension and a digital beamforming in a signal processor unit, extracting a positive first-order peak and a negative first-order peak from the Doppler spectrum by a peak-searching method and selecting a stronger first-order peak $\sigma_R^{(1)}(\omega)$ from the positive and negative first-order peaks in a computer processor;
   (c) dividing a second-order spectrum on a stronger first-order peak side into an inner second-order spectrum and an outer second-order spectrum and separating the outer second-order spectrum on the stronger first-order peak side from the Doppler spectrum in the computer processor according to a Doppler frequency range of the outer second-order spectrum;
   (d) calculating $R_f(\omega)$ which is a function of the outer second-order spectrum divided by a first-order peak energy for the stronger side of the Doppler spectrum of the single radar frequency at the fan-shaped unit in the computer processor;
   (e) calculating $A_f$ which is defined as a single-frequency coefficient matrix of the nondirectional wave spectrum by linearizing the outer second-order spectrum on the side of the stronger first-order peak in the computer processor;
   (f) repeating the above steps (b) to (e), combining the sea echoes of different radar frequencies to construct a matrix R which is a function of the outer second-order spectrum divided by the first-order peak energy for the stronger side of the Doppler spectrum of multiple radar frequencies and merging coefficient matrices of the nondirectional wave spectrum from multiple radar frequencies into a matrix A in the computer processor; and
   (g) calculating a pseudo-inverse $A^+$ of the matrix A by a singular value decomposition and estimating the nondirectional wave spectrum at the fan-shaped unit from the matrix R and the pseudo-inverse $A^+$ in the computer processor.

2. The method of claim 1, wherein in (b), the Doppler spectrum at the fan-shaped unit is defined as: $\sigma(\omega)$, where $\omega$ represents a Doppler frequency generated by the motion of ocean waves to the multi-frequency HF radar; and $\sigma(\omega)$ represents a wave energy distribution at a different value of $\omega$; wherein in (b), the positive first-order peak and negative first-order peak are extracted from the Doppler spectrum at the fan-shaped unit using the peak searching method; the first-order peaks are defined as two peaks in the Doppler spectrum which are roughly symmetrically distributed on both sides of zero frequency; the first-order peaks are generated by the Bragg scattering of the waves of half the radar wavelength that are either advancing directly towards the multi-frequency HF radar or receding directly from the multi-frequency HF radar; wherein (b) comprises:
   searching for a point of a maximum amplitude in the Doppler frequency range $[0.6\omega_B, 1.4\omega_B]$ of the Doppler spectrum at the fan-shaped unit as the peak of the positive first-order peak, and recording the Doppler frequency of the peak of the positive first-order peak as $\omega_{P+}$, wherein $\omega_B=\sqrt{2gk_0}$, is a Bragg frequency, wherein $$k_0 = \frac{2\pi f}{c}$$

is a radar wavenumber; c is a speed of light; and f is a radar frequency;
   searching for a local minimum point inside the peak of the positive first-order peak where the Doppler frequency meets the inequation $\omega_{P+}-0.2\omega_B \leq \omega < \omega_{P+}$, and denoting the Doppler frequency of the local minimum point inside the peak of the positive first-order peak as $\omega_{L+}$;
   searching for the local minimum point outside the peak of the positive first-order peak where the Doppler frequency satisfies the inequation $\omega_{P+} < \omega \leq 0.2\omega_B + \omega_{P+}$, and recording the Doppler frequency of the local minimum point outside the peak of the positive first-order peak as $\omega_{R+}$;
   intercepting the Doppler spectrum at the fan-shaped unit with Doppler frequency $[\omega_{L+}, \omega_{R+}]$ as the positive first-order peak;
   searching for the point of the maximum amplitude in the Doppler frequency range $[-1.4\omega_B, -0.6\omega_B]$ of the Doppler spectrum at the fan-shaped unit as the peak of the negative first-order peak, and recording the Doppler frequency of the peak of the negative first-order peak as $\omega_{P-}$;
   searching for the local minimum point inside the peak of the negative first-order peak where the Doppler frequency meets the inequation $\omega_{P-} < \omega \le \omega_{P-} + 0.2\omega_B$, and denoting the Doppler frequency of the local minimum point inside the peak of the negative first-order peak as $\omega_{L-}$;

searching for the local minimum point outside the peak of the negative first-order peak where the Doppler frequency satisfies the inequation $\omega_{P-} - 0.2\omega_B \le \omega < \omega_{P-}$, and recording the Doppler frequency of the local minimum point outside the peak of the negative first-order peak as $\omega_{R-}$;

intercepting the Doppler spectrum at the fan-shaped unit with Doppler frequency $[\omega_{R-}, \omega_{L-}]$ as the negative first-order peak; and comparing the amplitude of the peak of the positive first-order peak with that of the negative first-order peak, and selecting the first-order peak with a larger amplitude of the peak point as the stronger first-order peak $\sigma_R^{(1)}(\omega)$.

3. The method of claim 1, wherein in (c), the second-order spectrum originated from the second-order scattering of ocean waves and radar waves is a continuum with lower amplitude than the first-order peaks and distributed around the first-order peaks; wherein (c) comprises the steps of:

(1) dividing the second-order spectrum on the stronger first-order peak side into an inner second-order spectrum and an outer second-order spectrum;

the Doppler frequency range of the outer second-order spectrum on the stronger first-order peak side is given as $$\begin{cases} \omega_{c+} < \omega \le 1.4\omega_B, & \text{when } \sigma_R^{(1)}(\omega) \text{ is the positive first-order peak} \\ -1.4\omega_B \le \omega < \omega_{c-}, & \text{when } \sigma_R^{(1)}(\omega) \text{ is the negative first-order peak} \end{cases};$$

the Doppler frequency range of the inner second-order spectrum on the stronger first-order peak side is given as $$\begin{cases} 0.6\omega_B \le \omega < \omega_{c+}, & \text{when } \sigma_R^{(1)}(\omega) \text{ is the positive first-order peak} \\ \omega_{c-} < \omega \le -0.6\omega_B, & \text{when } \sigma_R^{(1)}(\omega) \text{ is the negative first-order peak} \end{cases};$$

where $\omega$ is a Doppler frequency generated by the motion of ocean waves to a radar; $\omega_B = \sqrt{2gk_0}$ is a Bragg frequency; $k_0$ is a radar wavenumber;

$$\omega_{c+} = \frac{\sum_{\omega_{L+}}^{\omega_{R+}} \omega \cdot \sigma_R^{(1)}(\omega)}{\sum_{\omega_{L+}}^{\omega_{R+}} \sigma_R^{(1)}(\omega)} \text{ is a centroid}$$

frequency of the positive first-order peak; and $$\omega_{c-} = \frac{\sum_{\omega_{R-}}^{\omega_{L-}} \omega \cdot \sigma_R^{(1)}(\omega)}{\sum_{\omega_{R-}}^{\omega_{L-}} \sigma_R^{(1)}(\omega)} \text{ is a centroid frequency of the negative first-order peak;}$$

(2) if the stronger first-order peak obtained in (b) of claim 1 is the positive first-order peak, taking the centroid frequency $\omega_{c+}$, as a starting point of Doppler frequency, taking a cutoff frequency of $1.4\omega_B$ as an endpoint, extracting the Doppler spectrum at the fan-shaped unit $\sigma(\omega)$ in the frequency range of $(\omega_{c+}, 1.4\omega_B]$, and setting the Doppler spectrum at the fan-shaped unit $\sigma(\omega)$ in the frequency range of $(\omega_{c+}, \omega_{R+}]$ to zero to obtain the outer second-order spectrum on the stronger first-order peak side $\sigma_R^{(2)}(\omega)$;

if the stronger first-order peak obtained in (b) of claim 1 is the negative first-order peak, taking the centroid frequency $\omega_{c-}$ as the starting point of Doppler frequency, taking a cutoff frequency of $-1.4\omega_B$ as the endpoint, extracting the Doppler spectrum at the fan-shaped unit $\sigma(\omega)$ in the frequency range of $[-1.4\omega_B, \omega_{c-})$, and setting the Doppler spectrum at the fan-shaped unit $\sigma(\omega)$ in the frequency range of $[\omega_{R-}, \omega_{c-})$ to zero to obtain the outer second-order spectrum on the stronger first-order peak side $\sigma_R^{(2)}(\omega)$.

4. The method of claim 1, wherein in (d), the aforementioned function $R_f(\omega)$ is given by the equation:

$$\begin{cases} R_f(\omega) = \dfrac{\sigma_R^{(2)}(\omega)}{\sum_{\omega_{L+}}^{\omega_{R+}} \sigma_R^{(1)}(\omega)\Delta\omega}, & \text{when } \sigma_R^{(1)}(\omega) \text{ is the positive first-order peak} \\[2ex] R_f(\omega) = \dfrac{\sigma_R^{(2)}(\omega)}{\sum_{\omega_{R-}}^{\omega_{L-}} \sigma_R^{(1)}(\omega)\Delta\omega}, & \text{when } \sigma_R^{(1)}(\omega) \text{ is the negative first-order peak} \end{cases};$$

where f in a subscript indicates a radar frequency; $\sigma_R^{(1)}(\omega)$ is the stronger first-order peak; $\sigma_R^{(2)}(\omega)$ is the outer second-order spectrum on the stronger first-order peak side; $\omega_{L+}$ is the Doppler frequency of the local minimum point inside the peak of the positive first-order peak; $\omega_{R+}$ is the Doppler frequency of the local minimum point outside the peak of the positive first-order peak; $\omega_{L-}$ is the Doppler frequency of the local minimum point inside the peak of the negative first-order peak; $\omega_{R-}$ is the Doppler frequency of the local minimum point outside the negative first-order peak; and $\Delta\omega$ is a frequency resolution of the Doppler spectrum $\sigma(\omega)$.

5. The method of claim 1, wherein (e) comprises the steps of:

(1) linearizing the outer second-order spectrum on the side of the stronger first-order peak; at the Doppler frequencies near the first-order peak that satisfy the condition $\omega_B < |\omega| \le 1.4\omega_B$, the direction of one of the two sets of ocean waves that generate the second-order scattering with the radar vector is approximately equal to that of the Bragg wave vector, so the outer second-order spectrum $\sigma_R^{(2)}(\omega)$ is linearized as $\sigma_{RL}^{(2)}(\omega)$:

$$\sigma_{RL}^{(2)}(\omega) = \sum_{\theta=0}^{2\pi} 2^8 \pi k_0^4 |\Gamma|^2 S(m\vec{k}) S(-2m'\vec{k_0}) \frac{(2k_0)^4}{k'^4} y^{*3} \left|\frac{\partial y}{\partial h}\right|_{\theta, y=y^*} \cdot \Delta\theta,$$

$$m = m' = 1 \text{ or } -1$$

where $k_0$ is a radar wavenumber; k and k' are the wavenumber of two sets of ocean waves which generate the second-order scattering with the radar wave vector $\vec{k_0}$; $\theta$ is an angle between the ocean wave vector $\vec{k}$ and the radar wave vector $\vec{k_0}$; $\Delta\theta$ is a discrete interval of $\theta$; $S(\vec{\cdot})$ is a directional wave spectrum; if m=m'=1, $\sigma_R^{(2)}(\omega)$ indicates the outer second-order spectrum on the positive first-order peak side; if m=m'=−1, $\sigma_R^{(2)}(\omega)$ indicates the outer second-order spectrum on the negative first-order peak side; $\omega$ is a Doppler frequency; $\Gamma$ is a coupling coefficient; y, y* and h are intermediate variables defined for the convenience of calculation, wherein $y=\sqrt{k}$ and $h=mg^{1/2}y+m'g^{1/2}\sqrt{k'}$, g is the acceleration of gravity; and y* is the solution of constant Doppler frequency contours denoted by $\omega-h=0$;

(2) obtaining $A_f(\theta)$ which is defined as the single-frequency coefficient matrix of the directional wave spectrum by calculating the theoretical value of a function of the linearized outer second-order spectrum $\sigma_{RL}^{(2)}(\omega)$ divided by the stronger first-order peak energy $\sigma_R^{(1)}(\omega)$;

$$\frac{\sigma_{RL}^{(2)}(\omega)}{\sigma_R^{(1)}(\omega_B)} = \sum_{\theta=0}^{2\pi} A_f(\theta)S(m\vec{k})\Delta\theta,$$

when $\sigma_R^{(1)}(\omega)$ is the positive first-order peak $$\frac{\sigma_{RL}^{(2)}(\omega)}{\sigma_R^{(1)}(-\omega_B)} = \sum_{\theta=0}^{2\pi} A_f(\theta)S(m\vec{k})\Delta\theta,$$

when $\sigma_R^{(1)}(\omega)$ is the negative first-order peak where $A_f(\theta)$ is the single-frequency coefficient matrix of the directional wave spectrum; f in the subscript is the radar frequency; $S(\vec{\cdot})$ is the directional wave spectrum; k is the wavenumber of a set of waves that generate second-order scattering with the radar wave vector; $\theta$ is the angle between the ocean wave vector $\vec{k}$ and the radar wave vector $\vec{k_0}$; $\Delta\theta$ is the discrete interval of $\theta$; $\sigma_R^{(1)}(\omega_B)$ and $\sigma_R^{(1)}(-\omega_B)$ are the theoretical values of the first-order peaks; the theoretical value of the stronger first-order peak is given as:

$\sigma_R^{(1)}(\omega_B)=2^6\pi k_0^4 S(-2\vec{k_0})$, when $\sigma_R^{(1)}(\omega)$ is the positive first-order peak $\sigma_R^{(1)}(-\omega_B)=2^6\pi k_0^4 S(2\vec{k_0})$, when $\sigma_R^{(1)}(\omega)$ is the negative first-order peak whereby the single-frequency coefficient matrix of the directional wave spectrum $A_f(\theta)$ is given as:

$$A_f(\theta) = |\Gamma|^2 \frac{4(2k_0)^4 y^{*3}}{(k')^4} \left|\frac{\partial y}{\partial h}\right|_{\theta,y=y^*}$$

where $\Gamma$ is the coupling coefficient; $k_0$ is the radar wavenumber; k' is the wavenumber of a set of ocean waves which generate the second-order scattering with the radar wave vector; $\theta$ is the angle between the ocean wave vector $\vec{k}$ and the radar wave vector $\vec{k_0}$; y, y* and h are intermediate variables defined for the convenience of calculation, wherein $y=\sqrt{k}$ and $h=mg^{1/2}y+m'g^{1/2}\vec{k'}$, wherein g is the acceleration of gravity; and y* is the solution of constant Doppler frequency contours denoted by $\omega-h=0$;

(3) calculating $A_f$ which is defined as the single-frequency coefficient matrix of the nondirectional wave spectrum by discretizing $\theta$ into n pieces at equal intervals and summing all terms of $\theta$ in the following equation:

$$A_f = \sum_{\theta=0}^{2\pi} A_f(\theta)G(\theta)\Delta\theta$$

where $A_f(\theta)$ is the single-frequency coefficient matrix of the directional wave spectrum; f in the subscript is the radar frequency; $\theta$ is the angle between the ocean wave vector $\vec{k}$ and the radar wave vector $$\vec{k_0}; \Delta\theta = \frac{2\pi}{n}$$

is the discrete interval of $\theta$; $G(\theta)$ is the direction distribution function of the directional wave spectrum.

6. The method of claim 1, wherein (f) comprises the step of:

merging $R_f(\omega)$ which is defined as the function of the outer second-order spectrum divided by the first-order peak energy for the stronger side of the Doppler spectrum of each frequency and $A_f$ which is defined as the single-frequency coefficient matrix of the nondirectional wave spectrum into a matrix R and a matrix A respectively according to the following equation:

$R=[R_{f_1}(\omega)R_{f_2}(\omega)R_{f_3}(\omega)R_{f_4}(\omega)]^T$ $A=[A_{f_1}A_{f_2}A_{f_3}A_{f_4}]^T$ where $R_{f_1}(\omega)$, $R_{f_2}(\omega)$, $R_{f_3}(\omega)$ and $R_{f_4}(\omega)$ are the functions of the outer second-order spectrum divided by the first-order peak energy for the stronger side of the Doppler spectrum extracted from the sea echoes of radar frequencies $f_1$, $f_2$, $f_3$ and $f_4$, respectively; $A_{f_1}$, $A_{f_2}$, $A_{f_3}$, and $A_{f_4}$ are the coefficient matrices of the nondirectional wave spectrum from the sea echoes of radar frequencies $f_1$, $f_2$, $f_3$ and $f_4$, respectively.

7. The method of claim 1, wherein (g) comprises the steps of:

calculating the pseudo-inverse $A^+$ of the matrix A by the singular value decomposition; and estimating the nondirectional wave spectrum S(k) from the matrix R and the pseudo-inverse $A^+$ by the equation $S(k)=A^+R$.

8. The method of claim 1, being carried out in an apparatus, the apparatus comprising a multi-frequency HF radar and a computer processor:

the multi-frequency HF radar comprising:

a transmitter for transmitting electromagnetic wave signals with multiple frequencies between 3-30 MHz in the HF band to the sea surface;

a receiver for receiving sea echoes of multiple radar frequencies originated from the electromagnetic wave signals modulated by sea surface movements; and a signal processor unit for obtaining each Doppler spectrum from the sea echo of each radar frequency at a fan-shaped unit by performing the first FFT in distance dimension, the second FFT in Doppler frequency dimension and the digital beamforming;

the computer processor providing code segments for:

(1) extracting a positive first-order peak and a negative first-order peak from a Doppler spectrum of a single radar frequency by a peak-searching method and selecting a stronger first-order peak $\sigma_R^{(1)}(\omega)$ from the positive and negative first-order peaks;

(2) dividing a second-order spectrum on a stronger first-order peak side into an inner second-order spectrum and an outer second-order spectrum and separating the outer second-order spectrum on the stronger first-order peak side from the Doppler spectrum according to a Doppler frequency range of the outer second-order spectrum;

(3) calculating $R_f(\omega)$ which is a function of the outer second-order spectrum divided by a first-order peak energy for the stronger side of the Doppler spectrum of the single radar frequency at the fan-shaped unit;

(4) calculating $A_f$ which is defined as a single-frequency coefficient matrix of the nondirectional wave spectrum by linearizing the outer second-order spectrum on the side of the stronger first-order peak;

(5) repeating the above steps (1) to (4), combining the sea echoes of different radar frequencies to construct a matrix R which is a function of the outer second-order spectrum divided by the first-order peak energy for the stronger side of the Doppler spectrum of multiple radar frequencies and merging coefficient matrices of the nondirectional wave spectrum from multiple radar frequencies into a matrix A; and (6) calculating a pseudo-inverse $A^+$ of the matrix A by a singular value decomposition and estimating the nondirectional wave spectrum at the fan-shaped unit from the matrix R and the pseudo-inverse $A^+$.

* * * * *